Figure 5:
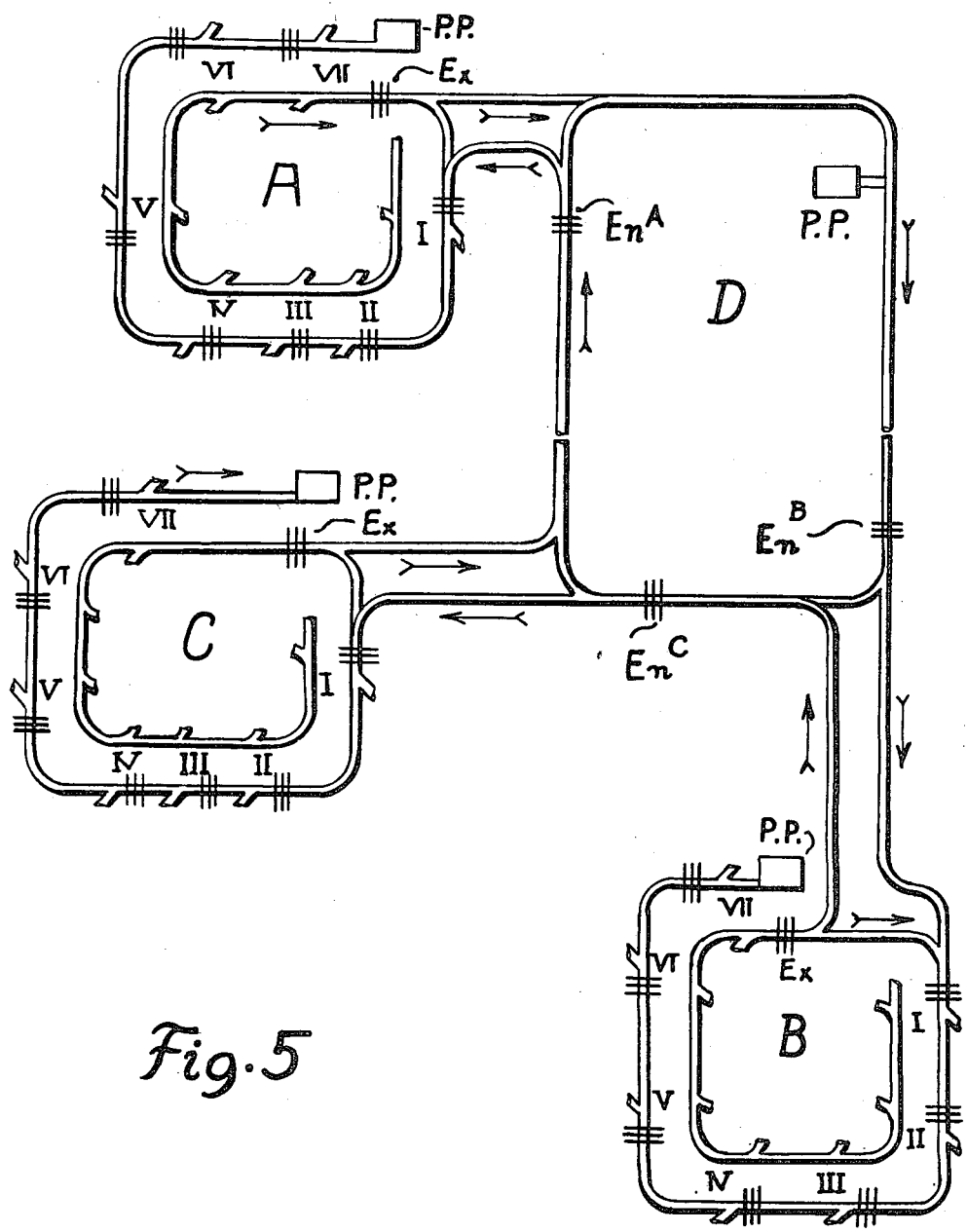

June 24, 1952     J. W. HALPERN     2,601,391
CONTROL SYSTEM FOR PNEUMATIC DISPATCH SYSTEMS
Filed Feb. 26, 1948     4 Sheets-Sheet 1
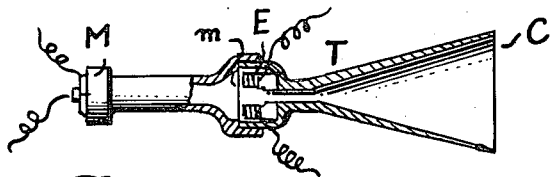
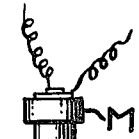
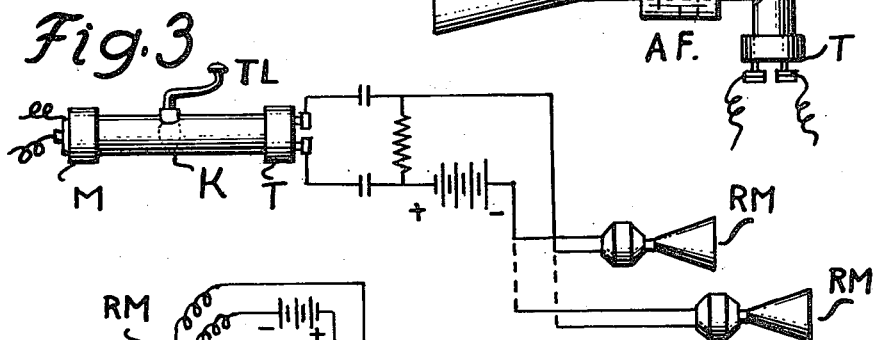
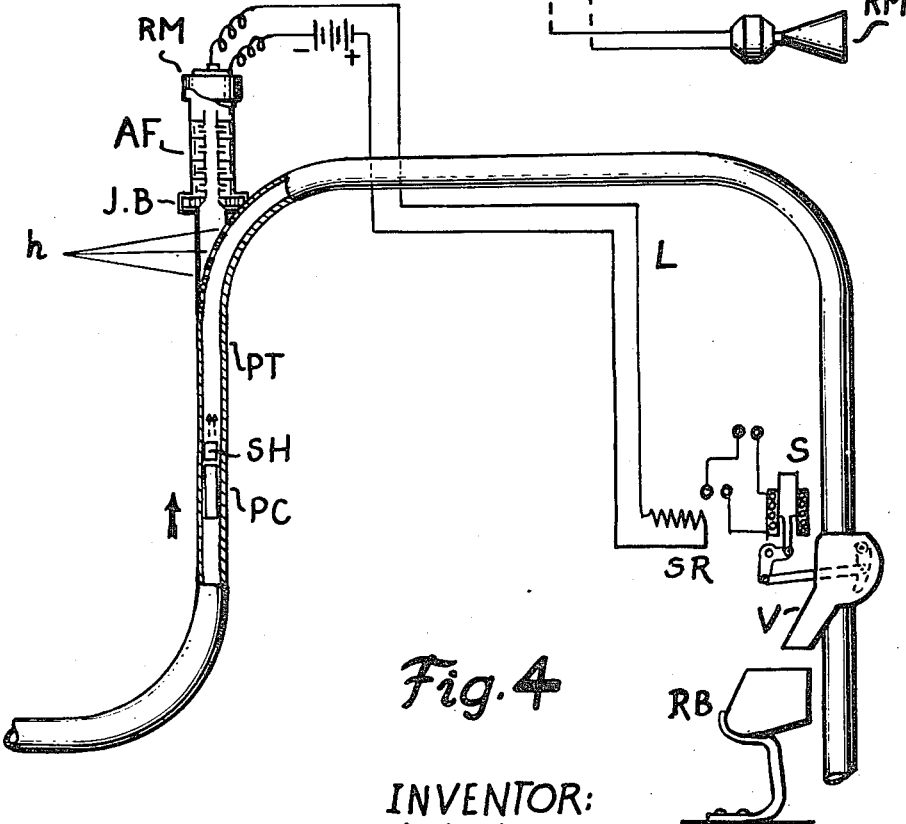
INVENTOR:
J. W. Halpern June 24, 1952  J. W. HALPERN  2,601,391
CONTROL SYSTEM FOR PNEUMATIC DISPATCH SYSTEMS
Filed Feb. 26, 1948  4 Sheets-Sheet 3

INVENTOR: J. W. Halpern

INVENTOR: J. W. Halpern

Patented June 24, 1952

2,601,391

UNITED STATES PATENT OFFICE 2,601,391

CONTROL SYSTEM FOR PNEUMATIC DISPATCH SYSTEMS

Johannes Wolfgang Halpern, Vesterbrogade 136", Copenhagen, Denmark

Application February 26, 1948, Serial No. 11,054
In Great Britain March 31, 1944

Section 1, Public Law 690, August 8, 1946
Patent expires March 31, 1964

2 Claims. (Cl. 243—16)

The invention relates to control systems for objects travelling in prescribed paths. An example of such a system is a pneumatic tube dispatch system, but the invention is applicable to many other systems of the kind referred to. At certain points in these systems switching stations are provided for diverting the travelling object from what may be regarded as the normal path into a branch or alternative path.

The desired path for any object is usually preselected by the person starting the object on its journey and the various switches are set by electrical remote control or the like. The path to be traversed by the object must then be reserved exclusively for that object or others traversing precisely the same path until the object, or the last of them, has passed the last switching station. Only then can a new path be set by changing the settings of the switches.

The object of the present invention is to provide on the travelling object itself means for causing the switches appropriate to the intended journey to be set as the object approaches each. Thus on any one portion of the path there may be several objects in course of transit to different destinations, each of which will be diverted automatically at the desired stations to arrive at the intended points.

According to the invention in a system of the kind referred to each travelling object carries means for emitting vibrations, such as sound waves, of a selected one of a number of fixed frequencies or groups of fixed frequencies, and each switching station is associated with means responsive to one of the said frequencies or groups of frequencies to set the switch automatically to the desired position on the approach of an object emitting that frequency or group of frequencies.

It has been proposed in the control of railway traffic to use a radio transmitter on a train to give signals to an automatic control device, but the radio frequency was caused to vary in accordance with the distance of the train from some fixed point, and the receiver had to be tuned to the frequency appropriate to its location. The present invention on the other hand used fixed frequencies for preselection of the route to be traversed.

Sound waves are particularly suitable, but it is also possible to use vibrations of a similar nature but of supersonic pitch, especially where audible sounds may be undesirable. In a pneumatic tube dispatch system the frequencies may conveniently be generated by vibrating reeds actuated by the pressure difference between the two ends of the carrier.

In most cases the group of frequencies will be a combination of a certain number out of a set of frequencies. For instance the whole system may employ eight different frequencies and each switching station may include a device responsive to a particular three of the eight frequencies. Fifty-six stations could then be equipped with devices responsive each to a different group of three frequencies. There is no difficulty in constructing a carrier for a pneumatic system with a front chamber and eight reeds tuned to the eight frequencies. The chamber would be provided with air by a tube from the rear of the carrier, and the air outlets of the separate reeds would have devices for opening or closing them as desired.

One form of sound-responsive member comprises an electro-acoustic circuit on the verge of instability. The circuit includes a microphone, an amplifier if necessary and a telephone so placed that the sound impinges on the microphone. It is well known that such a circuit can be brought to self-oscillation, if the telephone is placed near enough to the microphone, and that each circuit produces a particular note dependent on its characteristics. If the circuit is a little short of self-oscillation, there is still a particular note or frequency to which it exhibits a maximum of sensitiveness. When a sound of this frequency impinges on the microphone in sufficient strength, the circuit passes into self-oscillation, whereas any other note is without effect.

A better and cheaper responsive device for penumatic tube systems comprises a short length of thin-walled tube, preferably of steel, inserted in the run of the pneumatic tube. The tube has its own inherent note, of which the pitch can be ascertained by striking it. A casing surrounds the tube and in the intervening space carbon granules are packed to form a microphone. When vibrations of the inherent frequency of the tube impinge thereon, the microphone responds and any desired operation can be initiated from the associated electrical circuit.

The invention is illustrated by an embodiment shown in the drawings accompanying the provisional specification, wherein Figure 1 is an elevation partly in section of an electro-acoustic relay, Figure 2 is a modification to include a filter, Figure 3 shows a modification of the electro-acoustic circuit, Figure 4 is a diagram of a part of the pneumatic tube system to show the application of the invention thereto, and Figure 5 is a line diagram of a complete pneumatic tube system with 21 arrival and departure stations and 6 switching stations.

Figure 7:
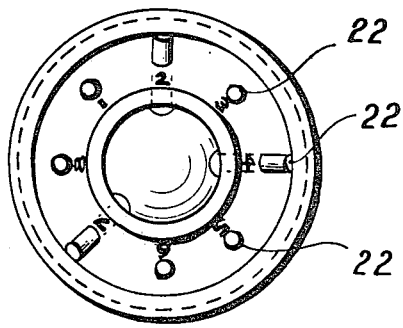
Figure 6:
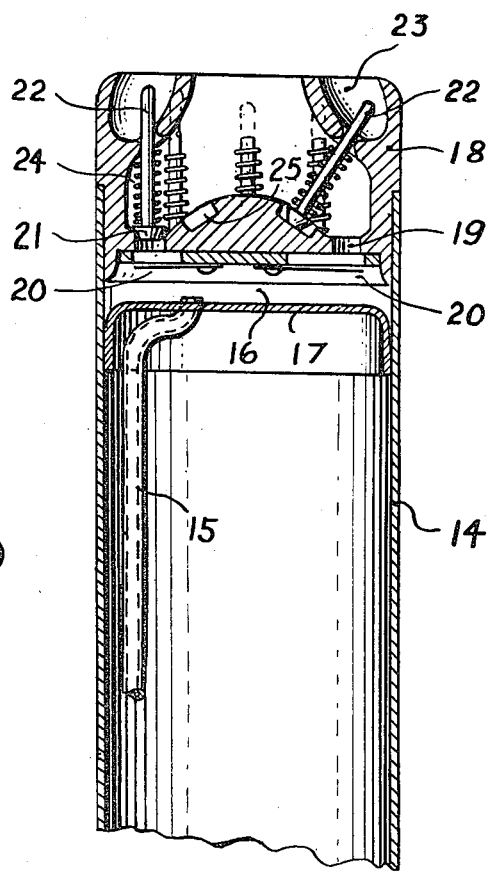
Figure 8:
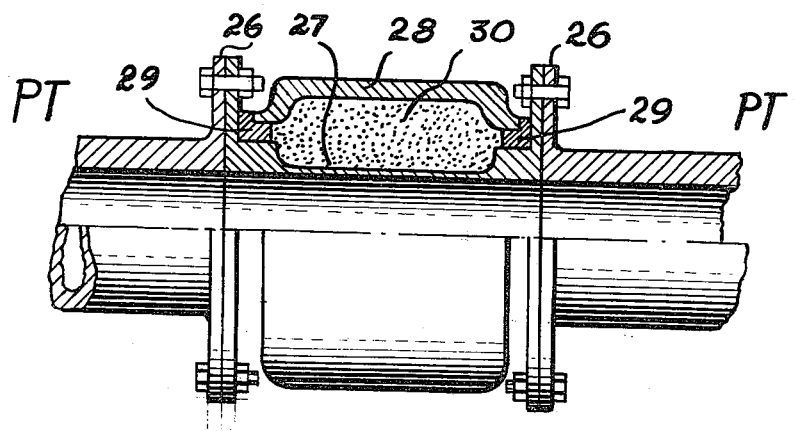

Details of other forms of construction are shown in the drawings accompanying the present specification, and therein Figure 6 is a central section through the front part of a carrier for a pneumatic tube, Figure 7 is a front end view of the same, Figure 8 shows details of a response element of the thin-walled tube type.

Figure 9:
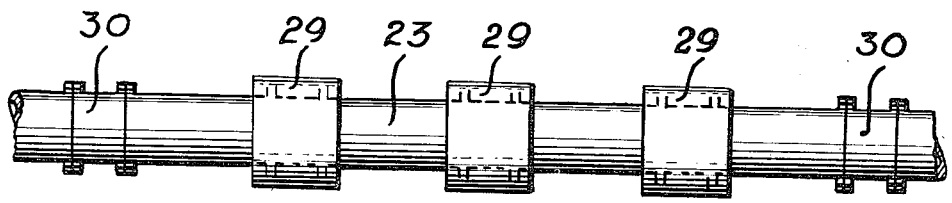
Figure 10:
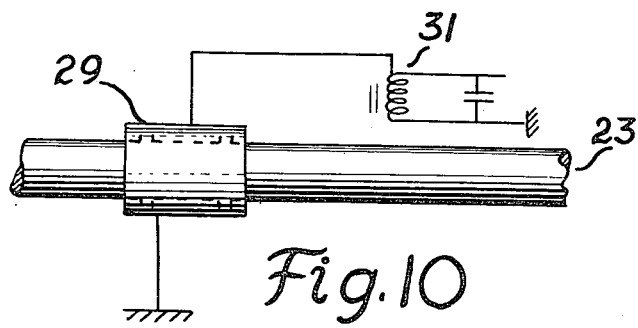

Figure 9 shows diagrammatically the insertion of a set of such elements near a switching station, and Figure 10 is an elementary diagram to illustrate the inclusion of an electrical filter circuit.

Referring first to Figure 1, a microphone M and a loud speaker or telephone T are connected together by an acoustic link K in the form of an air column enclosed in a tube. A collecting cone C for the sound is shown for use where the electro-acoustic relay is mounted in the open, but where used in a pneumatic tube, as in Figure 4, the cone is not provided. The electrical circuit is not shown, but it includes the usual battery for the microphone and an amplifier if required. Sound vibrations impinging on the diaphragm $m$ will cause the latter to vibrate, and, if they are of the same frequency as the inherent frequency of the relay, the circuit will be set into oscillation, and the switching device will be operated.

It may be found necessary in some cases to incorporate an acoustic filter to cut out harmonics or other frequencies related to the response frequency. Figure 2 shows a suitable arrangement, where AF is the acoustic filter. Wires or like devices tuned to the undesired frequencies serve to absorb these from the gamut passing into the collecting cone C.

In the arrangement of Figure 3 the sound is not applied direct to the telephone or loud-speaker diaphragm of the electro-acoustic relay circuit, but it is picked up by a number of microphones RM located at different positions. Two are shown in the figure, but any number may be used so as to obtain a suitable average of the sound emitted by the travelling object. The vibrations picked up are applied in the form of electrical impulses to the electrical part of the electro-acoustic relay. Figure 3 also shows a handle TL attached to a kind of butterfly valve for tuning the relay circuit to the desired frequency.

Referring now to Figure 4 a portion of a pneumatic tube dispatch system is shown, which includes one station at which it may be required to deliver a carrier, while other carriers have to pass the station and proceed to other destinations.

The tube itself is shown at PT, while RB is the receiver basket into which a carrier PC has to be ejected. For this purpose a switch or valve V can be swung over from the straight through position shown in the figure to divert the carrier into the basket RB. The carrier PC is provided with a sound head SH which emits a musical note or a combination of notes. The sound head will be described in detail later.

At a part of the tube PT which may be 2 to 10 yards before the valve V according to requirements, a branch JB is taken off the main tube PT, but to prevent the carrier from passing into the branch and yet to allow the sound free access, the wall of the tube PT is continued but provided with holes $h$ making communication with the branch JB. On the end of the branch an acoustic filter AF is attached by a sound-insulating rubber washer. The sound is picked up by a microphone RM and corresponding electrical impulses are transmitted along a line L to a selective relay SR in the manner indicated in Figure 3. If the note emitted by the sound head SH is that to which the relay SR is responsive, the current passed by the relay SR energises a solenoid S, which turns the valve V to the position in which the carrier will be ejected into the basket RB.

Where a group or combination of frequencies is used, there will have to be one relay SR for each frequency of the combination appropriate to that station with their output sides connected in series, so that the solenoid S is only energised when all the frequencies of the particular combination are present.

An example of a complete system is shown in diagram form in Figure 5. This system has 21 sending and receiving stations, and by the selective use of one or more of seven frequencies a carrier may be sent from any station to any other. In the system illustrated there are three self-contained circuits, A, B and C, which are interconnected to permit a carrier to pass from a station of one circuit to that of another. Each circuit has seven stations identified by Roman numerals from I to VII.

In each circuit the sending points of the seven stations are shown on an inner loop and the receiving points on an outer loop in such a manner that the route along the tube in the direction of travel passes first through all the sending points and then through all the receiving points. At the station VI in circuit B, for instance the sending point is denoted by the reference 11, the receiving point by the reference 12, while 13 is the switch for diverting the carrier into the branch to the receiving point 12. Similar conventional indications but without numerical references are used for the corresponding parts of other stations and other switching points, to which reference will be made subsequently. The power plant for producing the operating vacuum is indicated at P. P.

First consider one circuit by itself, assuming that the switch marked Ex is not moved from its normal position, so that a carrier passing the sending point of station VII goes on to the receiving point of station I. For selecting any station within the circuit three frequencies are sufficient, for example $a=500$, $b=760$ and $c=1200$, all frequencies being in cycles per second. The frequencies to which the switch relays at the various stations respond are in accordance with the following table:

Station I, frequencies $a$, $b$ and $c$ combined
Station II, frequencies $a$ and $b$ combined
Station III, frequencies $a$ and $c$ combined
Station IV, frequencies $b$ and $c$ combined
Station V, frequency $a$ alone
Station VI, frequency $b$ alone
Station VII, frequency $c$ alone A carrier emiting only one or two frequencies will fail to energise the relay at station I; likewise a carrier emiting only one frequency will fail to energise the relay at station II, III, or IV. Accordingly any carrier will be delivered at the station tuned to the same frequency or frequency group as is being emitted by that carrier.

If a carrier has to be sent from a station in one circuit to a station in another circuit, an additional frequency is provided to open a switch Ex, by which the carrier enters a closed loop circuit D. This frequency will be referred to as d and may be 2,000. The circuit D has three switches EnA, EnB and EnC, by which entrance is obtained to circuits A, 100 and B and C respectively. Each of these switches is tuned to its own frequency. Thus EnA may respond to $e=2,500$, EnB to $f=2,900$ and EnC to $g=3,600$ cycles per second.

Suppose for instance a station in the A circuit has to send a carrier to station IV in circuit C. The sound head of the carrier must be set to emit frequencies b, c, d and g, namely 760, 1,200, 2,000 and 3,600. The frequency d first acts on the switch Ex to divert the carrier into the circuit D, then the carrier passes the switching station, EnB, leaving it unaffected because the frequency f which would actuate the switch is absent. On approaching the switching station EnC the frequency g actuates the switch so that the carrier is diverted into the circuit C. Here stations I, II and III remain unaffected because the frequency a is missing. At station IV, however, the combination of frequencies b and c causes the switch to operate, and the carrier is here diverted from the circuit to a receiving basket like RB of Figure 4.

A sound head for a carrier is shown in Figures 6 and 7 which can emit eight different frequencies either singly or in any combination. The body of the carrier is shown at 14, and close to the wall a small air tube 15 is carried to the rear, where it is in communication with the space in the pneumatic tube behind the carrier. At its front end the tube 15 terminates in an air chamber 16 comprised between the front wall 17 of the useful space in the carrier and the body 18 of the sound head.

The base of the body 18 has eight holes 19 equidistantly spaced in a circle to provide communication between the air chamber and the space in the pneumatic tube ahead of the carrier. Inside the air chamber 16, eight reeds 20 are mounted, one over each hole 19, the reeds all being tuned to different frequencies. Numerals 1 to 8 are engraved or otherwise inscribed on the front face of the body base 18 to enable an operator to identify the hole 19 associated with any one of the frequencies.

Each hole 19 is provided with a valve 21 having a long stem 22 to project into an annular recess 23 formed in the sound head 18. Each valve 21 has a spring 24 to urge it on to its seating as shown at the left hand side of Figure 6. In this positions the corresponding reed 20 is prevented from sounding because its air passage is blocked. Any valve can be opened by grasping the stem 22 and lifting the valve. Recesses 25 are provided to receive the valve heads removed from their respective holes 19, as shown at the right hand side of Figure 6. Figure 7 shows the sound head set to emit the group of frequencies identified by the numerals 2, 4 and 7.

A response device of a simpler form than those of Figures 1 to 4 is shown in Figure 8. The pneumatic tube PT is interrupted to receive the device, which is coupled in by flanges 26, 26. The device comprises a portion of thin-walled tube of the same bore as the tube PT and constituting for the carrier merely a continuation of the tube PT. The main portion 27 of the tube, which is preferably of steel, has its outside diameter turned or ground to respond to a particular frequency. This frequency, if in the audible range, can be heard by striking the tube a gentle blow.

A split hollow cylinder 28 surrounds the portion 27 and is spaced from the thickened ends by insulating washers 29, 29. The intervening annular space is packed with carbon granules 30 to constitute a microphone, which will respond only to the inherent frequency of the tube portion 27. This microphone is inserted in an electric circuit controlling a switch for diverting the carrier. Such circuits are well known.

Where a switch has to respond to a combination of frequencies, say three, the arrangement of Figure 9 is suitable. Three devices as shown in Figure 8 and denoted by the general reference 31 are inserted in the pneumatic tube PT with sound-insulating sections 32, 32 at each end. The devices 31, 31 are tuned to the respective frequencies, and relays actuated by them have their contacts connected in series so as to actuate the switch only when all three frequencies are present.

It may sometimes be necessary to guard against the actuation of the device 31 by spurious harmonic or other related frequencies. A filter circuit may then be included as shown at 33 in Figure 10, which will short-circuit all but the desired frequency.

It may in some cases be found preferable to modify the microphone arrangement of Figure 8. Instead of the space between the thin-walled cylinder 27 and the surrounding cylinder 28 being filled with carbon granules, it may be filled with air or be evacuated. The microphone would then be of the capacity type. Alternatively if both cylinders are of ferromagnetic material, the microphone could be of the electro-magnetic type.

The bore of the pneumatic tube may not be the most suitable in every case for that of the resonant thin-walled tube. If the latter is made larger, the continuity of the running surface is maintained by a grid of bars spaced away from the inside of the resonant tube. The length of gap bridged by the bars should of course be less than that of the carrier.

Having now particularly described and ascertained the nature of my said invention and in what manner the same is to be performed, I declare that what I claim is:

1. In a pneumatic conveyor system with automatic path and carrier control, the combination of carriers fitted with a special control head containing a system of air passages communicating with the air flow of the pneumatic tube, reeds fitted in the pathway of each of these passages and each tuned to a different control note, means for suppressing the vibration of any number of the reeds, branch-off tubes fitted to the main tube, a sound-detector arranged near each branch-off point to receive the sound generated by the reeds, a power-operated deflector disposed within the main tube at each branch-off point and a relay associated with the detector to switch the deflector into its operative position.

2. In a pneumatic conveyor system with automatic path and carrier control, the combination of carriers equipped with a generator of audible notes of pre-selected pitch and composition, a network of tubular guides, side branches issuing from the tube guides, portions of said tube guide reduced annularly to predetermined thicknesses, each reduced tube portion surrounded by a ring, carbon granules inserted between the exterior surface of the said reduced tube portion and the interior surface of the said ring, to form a special frequency selective microphone responsive to the sound generated by the carrier, a relaying circuit associated with the said microphone to supply power to a switch-over mechanism at branch-off points.

JOHANNES WOLFGANG HALPERN.

REFERENCES CITED

The following references are of record in the file of this patent:

UNITED STATES PATENTS

| Number | Name | Date |
|---|---|---|
| 1,797,651 | Gergacsevics | Mar. 24, 1931 |
| 1,858,897 | Lucas | May 17, 1932 |
| 2,073,443 | Cardoza | Mar. 9, 1937 |
| 2,138,878 | Phinney | Dec. 6, 1938 |
| 2,255,797 | Loughridge | Sept. 16, 1941 |